(12) United States Patent
Xu et al.

(10) Patent No.: US 11,003,886 B2
(45) Date of Patent: May 11, 2021

(54) DISPLAY APPARATUS INCLUDING A FINGERPRINT IDENTIFICATION DEVICE

(71) Applicant: BOE Technology Group Co., Ltd., Beijing (CN)

(72) Inventors: Rui Xu, Beijing (CN); Xue Dong, Beijing (CN); Haisheng Wang, Beijing (CN); Yingming Liu, Beijing (CN); Pinchao Gu, Beijing (CN); Changfeng Li, Beijing (CN); Qingrong Ren, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 293 days.

(21) Appl. No.: 16/082,444

(22) PCT Filed: Jan. 4, 2018

(86) PCT No.: PCT/CN2018/070783
§ 371 (c)(1),
(2) Date: Sep. 5, 2018

(87) PCT Pub. No.: WO2018/192274
PCT Pub. Date: Oct. 25, 2018

(65) Prior Publication Data
US 2020/0334436 A1 Oct. 22, 2020

(30) Foreign Application Priority Data
Apr. 17, 2017 (CN) .......................... 201710251094.3

(51) Int. Cl.
*G06K 9/00* (2006.01)
*G09F 9/33* (2006.01)

(52) U.S. Cl.
CPC ............. *G06K 9/0004* (2013.01); *G09F 9/33* (2013.01)

(58) Field of Classification Search
CPC ................................ G06K 9/0004; G09F 9/33
See application file for complete search history.

(56) References Cited

U.S. PATENT DOCUMENTS

2004/0205351 A1* 10/2004 Koide ....................... G06F 1/26
713/186
2013/0119237 A1* 5/2013 Raguin ............. H01L 27/14601
250/208.1
(Continued)

FOREIGN PATENT DOCUMENTS

CN  105205469 A  12/2015
CN  105550664    5/2016
(Continued)

OTHER PUBLICATIONS

International Search Report and Written Opinion of the International Searching Authority corresponding to PCT/CN2018/070783 dated Apr. 9, 2018. (15 pages with English translation).
(Continued)

*Primary Examiner* — Stephen G Sherman
(74) *Attorney, Agent, or Firm* — Myers Bigel, P.A.

(57) ABSTRACT

At least one embodiment of this disclosure provides a display apparatus for solving the problem of a low identification precision due to a relatively large distance between the finger and the fingerprint identification device. The display apparatus comprises a display panel and at least one fingerprint identification device. Each fingerprint identification device comprises a plurality of identification units arranged in an array, each identification unit being provided with a photosensitive element. The photosensitive element is used for performing photoelectric conversion of incident light. The fingerprint identification device further comprises a collimating filter layer arranged on a light entrance surface of the photosensitive element. The collimating filter layer comprises a plurality of strip-shaped light guide portions arranged to be spaced and parallel, a longitudinal direction of the plurality of strip-shaped light guide portions being substantially perpendicular to the light entrance surface of the photosensitive element.

20 Claims, 5 Drawing Sheets

(56) References Cited

U.S. PATENT DOCUMENTS

| | | | |
|---|---|---|---|
| 2016/0132712 A1* | 5/2016 | Yang | G06F 3/044 |
| | | | 348/77 |
| 2017/0017824 A1* | 1/2017 | Smith | G02B 5/005 |
| 2017/0220844 A1* | 8/2017 | Jones | H01L 27/3234 |
| 2017/0278909 A1* | 9/2017 | Jeon | A61B 5/1171 |
| 2018/0211085 A1 | 7/2018 | Liu et al. | |
| 2018/0307088 A1 | 10/2018 | Liu et al. | |
| 2019/0102593 A1 | 4/2019 | Wang et al. | |

FOREIGN PATENT DOCUMENTS

| | | |
|---|---|---|
| CN | 105678255 | 6/2016 |
| CN | 105844212 A | 8/2016 |
| CN | 106055162 | 10/2016 |
| CN | 106203046 A | 12/2016 |
| CN | 106228144 A | 12/2016 |
| CN | 107066976 | 8/2017 |
| WO | 2016/133701 A1 | 8/2016 |

OTHER PUBLICATIONS

First Office Action and English language translation, CN Application No. 201710251094.3, dated May 30, 2019, 18 Pp.

* cited by examiner

DISPLAY APPARATUS INCLUDING A FINGERPRINT IDENTIFICATION DEVICE

CROSS REFERENCE TO RELATED APPLICATIONS

The present application is a 35 U.S.C. 371 national stage application of PCT International Application No. PCT/CN2018/070783, filed on Jan. 4, 2018, which claims the priority of Chinese patent application No. 201710251094.3, filed on Apr. 17, 2017, the contents of which are incorporated herein by reference in their entireties.

FIELD

This disclosure relates to a display apparatus with the fingerprint identification function.

BACKGROUND

The fingerprint of the human body has uniqueness and invariance. Hence, the fingerprint identification technology has the characteristics of good security, high reliability, simple and convenient use, so that the fingerprint identification technology has been widely applied in various fields of protecting personal information security, particularly in a field of display apparatus, such as a mobile phone, a notebook computer, a tablet computer, a digital camera, etc.

SUMMARY

An aspect of this disclosure provides a display apparatus, comprising a display panel and at least one fingerprint identification device. Each fingerprint identification device comprises a plurality of identification units arranged in an array. Each identification unit is provided with a photosensitive element. The photosensitive element is used for performing photoelectric conversion of incident light. The fingerprint identification device further comprises a collimating filter layer arranged on a light entrance surface of the photosensitive element. The collimating filter layer comprises a plurality of strip-shaped light guide portions arranged to be spaced and parallel, a longitudinal direction of the plurality of strip-shaped light guide portions being substantially perpendicular to the light entrance surface of the photosensitive element. The collimating filter layer is used for enabling the incident light to be illuminated to the photosensitive element in parallel.

Optionally, the strip-shaped light guide portion is an optical fiber.

Optionally, the at least one fingerprint identification device comprises a first fingerprint identification device. The first fingerprint identification device is arranged on a non-light exit side of the display panel and located in a display area of the display panel, and the photosensitive element of the first fingerprint identification device is arranged on a side of the first fingerprint identification device away from the display panel and is configured to receive reflected display light.

Optionally, the at least one fingerprint identification device further comprises a second fingerprint identification device. The second fingerprint identification device is arranged on a non-light exit side of the display panel, and the photosensitive element of the second fingerprint identification device is arranged on a side of the second fingerprint identification device close to the display panel and is configured to receive reflected ambient light.

Optionally, the at least one fingerprint identification device comprises a second fingerprint identification device. The second fingerprint identification device is arranged on a non-light exit side of the display panel, and the photosensitive element of the second fingerprint identification device is arranged on a side of the second fingerprint identification device close to the display panel and is configured to receive reflected ambient light.

Optionally, the at least one fingerprint identification device comprises a third fingerprint identification device. The third fingerprint identification device is arranged on a light exit side of the display panel and located in a non-display area of the display panel. The photosensitive element of the third fingerprint identification device is arranged on a side of the third fingerprint identification device close to the display panel and is configured to receive reflected ambient light.

Optionally, the display panel is an OLED display panel or a LCD display panel.

Optionally, the display apparatus further comprises a carrier substrate arranged on a non-light exit side of the display panel. The first fingerprint identification device is arranged on a surface of the carrier substrate facing the display panel, and the second fingerprint identification device is arranged on a surface of the carrier substrate away from the display panel.

Optionally, the display apparatus further comprises a carrier substrate arranged on a non-light exit side of the display panel. The first fingerprint identification device and the second fingerprint identification device are arranged on a surface of the carrier substrate facing the display panel. An orthographic projection of the first fingerprint identification device on the carrier substrate and an orthographic projection of the second fingerprint identification device on the carrier substrate do not overlap with each other.

Optionally, the strip-shaped light guide portion is an optical fiber. In the collimating filter layer of the first fingerprint identification device, a numerical aperture of the optical fiber is 0.001~0.2 and a core diameter of the optical fiber is 6 μm~80 μm.

Optionally, the strip-shaped light guide portion is an optical fiber. In the collimating filter layer of the second fingerprint identification device, a numerical aperture of the optical fiber is 0.8~1 and a core diameter of the optical fiber is 6 μm~80 μm.

Optionally, the photosensitive element comprises a photoelectric conversion layer and a light shielding layer. The light shielding layer is closer to the carrier substrate than the photoelectric conversion layer.

Optionally, the display apparatus further comprises a push-pull baffle arranged on a light entrance side of the second fingerprint identification device. The baffle is used for exposing the second fingerprint identification device in a push-open state, and covering a light entrance side of the second fingerprint identification device in a pull-up state.

Optionally, the fingerprint identification device further comprises a plurality of crisscrossed scanning lines and read signal lines. The scanning lines and the read signal lines cross-define a plurality of the identification units. Each of the identification units comprises a switch transistor, a first electrode of the switch transistor being coupled to the read signal line, a gate of the switch transistor being coupled to the scanning line, and a second electrode of the switch transistor being coupled to the photosensitive element.

Optionally, the strip-shaped light guide portion is made of a material selected from a group of: a reflective metal material, glass and a resin material.

BRIEF DESCRIPTION OF THE DRAWINGS

In order to illustrate the technical solutions in embodiments of this disclosure or the prior art more clearly, the drawings to be used in describing the embodiments or the prior art will be introduced briefly below. Apparently, the drawings described below are only some embodiments of this disclosure. Other drawings can also be obtained from these drawings by the ordinary skilled person in the art without creative efforts.

DETAILED DESCRIPTION

The technical solutions in the embodiments of this disclosure will be described clearly and completely below in conjunction with the drawings in the embodiments of this disclosure. Apparently, the embodiments described are only a part of, rather than all of the embodiments of this disclosure. Based on the embodiments in this disclosure, all other embodiments obtained by the ordinary skilled person in the art without creative efforts belong to the protection scope of this disclosure.

Figure 1:
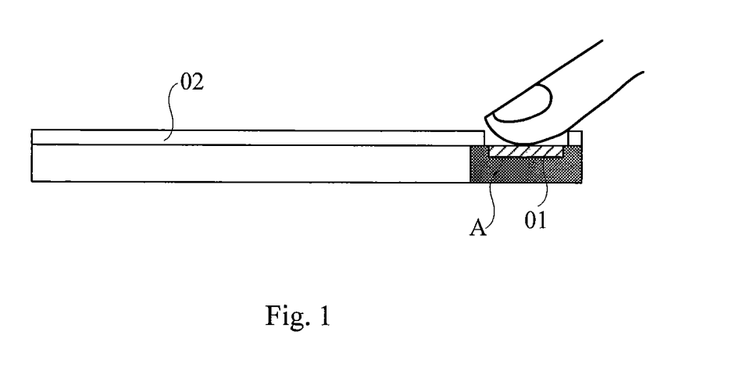
FIG. 1 is a structural schematic view of a display apparatus with the fingerprint identification function.

In order to enable the display apparatus to have the fingerprint identification function, as shown in FIG. 1, a fingerprint identification device 01 is generally disposed in a non-display area A of the display apparatus. When the finger is in contact with the cover glass 02 of the display apparatus at a position corresponding to the fingerprint identification device 01, the fingerprint identification device 01 can identify the fingerprint of the user.

Because the cover glass 02 increases the distance between the finger and the fingerprint identification device 01, the identification precision is reduced. In order to solve the above problem, a touch hole is generally provided on the cover glass 02 at a position corresponding to the fingerprint identification device, thereby enabling the finger to be in contact with the fingerprint identification device 01 through the touch hole, so as to improve the identification precision. However, in this way, a cutting process has to be added in the manufacturing process of the display apparatus, which increases the defective rate and the production cost.

At least one embodiment of this disclosure provides a display apparatus with the fingerprint identification function, which can solve the problem of low identification precision due to a relatively large distance between the finger and the fingerprint identification device.

Figure 2:
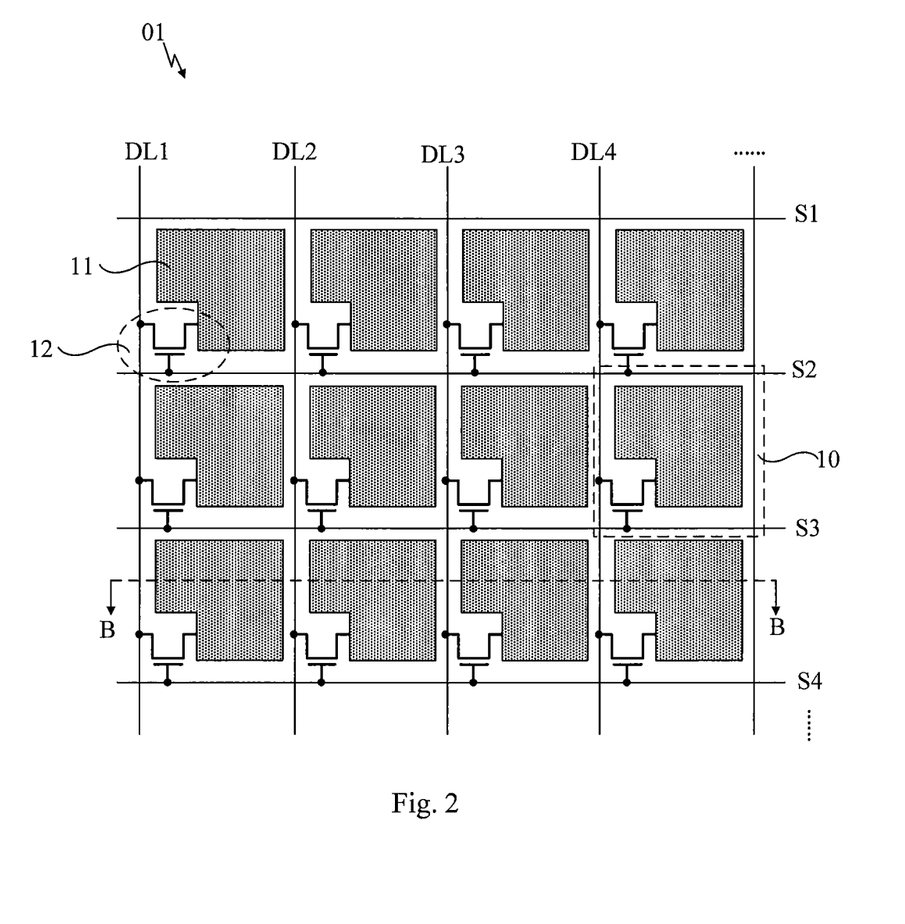
FIG. 2 is a structural schematic view of a fingerprint identification device provided by at least one embodiment of this disclosure.

At least one embodiment of this disclosure provides a display apparatus with the fingerprint identification function. The display apparatus comprises a display panel and at least one fingerprint identification device 01 as shown in FIG. 2.

Figure 5:
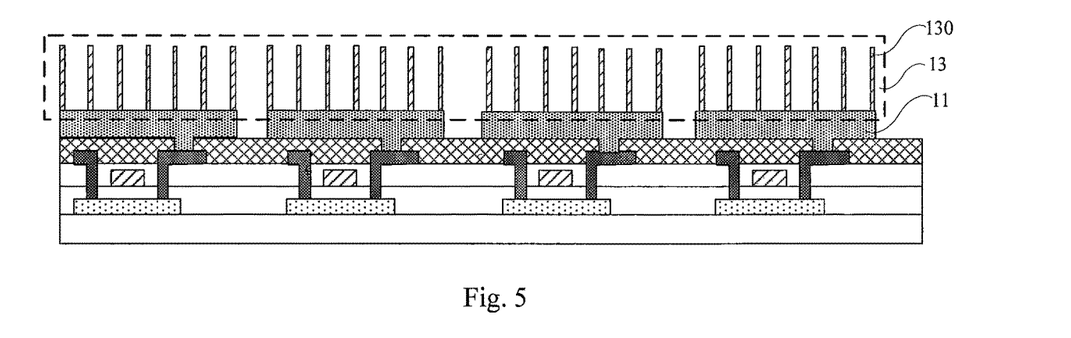
FIG. 5 is a sectional view of a fingerprint identification device provided by at least one embodiment of this disclosure.

Each fingerprint identification device 01 comprises a plurality of identification units 10 arranged in an array. Each identification unit 10 is provided with a photosensitive element 11. The photosensitive element 11 is used for performing photoelectric conversion of the incident light. The fingerprint identification device 01 further comprises a collimating filter layer 13 disposed on a light entrance surface of the photosensitive element 11 as shown in FIG. 5. The collimating filter layer 13 comprises a plurality of strip-shaped light guide portions 130 which are disposed to be spaced and parallel, a longitudinal direction of the plurality of strip-shaped light guide portions 130 being substantially perpendicular to the light entrance surface of the photosensitive element 11. The collimating filter layer 13 is used for enabling the incident light to be illuminated to the photosensitive element 11 in parallel.

Specifically, the fingerprint identification device 01 can comprise a plurality of crisscrossed scanning lines (S1, S2, S3, S4 . . . ) and read signal lines (DL1, DL2, DL3, DL4 . . . ). The scanning lines (S1, S2, S3, S4 . . . ) and the read signal lines (DL1, DL2, DL3, DL4 . . . ) cross-define a plurality of identification units 10. Each identification unit 10 is further provided with a switch transistor 12. A first electrode of the switch transistor 12 is coupled to a read signal line, e.g., DL1, a gate of the switch transistor 12 is coupled to a scanning line, e.g., S1, and a second electrode of the switch transistor 12 is coupled to the photosensitive element 11.

Figure 3:
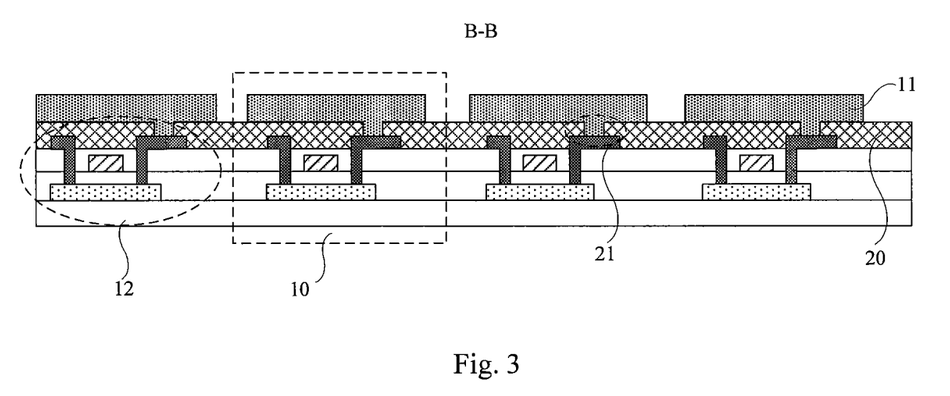
FIG. 3 is a sectional view of the fingerprint identification device of FIG. 2 along the line B-B.

It should be noted that the first electrode of the switch transistor 12 is the source, the second electrode is the drain; or the first electrode is the drain, the second electrode is the source. Furthermore, this disclosure does not define the type of the switch transistor 12, which can be a top gate type thin film transistor as shown in FIG. 3 and also can be a bottom gate type thin film transistor. Furthermore, the switch transistor 12 can be an N-type thin film transistor and also can be a P-type thin film transistor.

Further, in order to increase the area of the photosensitive element 11 that receives light to achieve the purpose of improving the photoelectric conversion efficiency, optionally, as shown in FIG. 3, the photosensitive element 11 can fully cover the switch transistor 12 coupled with the photosensitive element 11. An insulating layer 20 is disposed between the photosensitive element 11 and the switch transistor 12. The insulating layer 20 is provided with a contact hole 21 at a position corresponding to the second electrode of the switch transistor 12. The photosensitive element 11 is coupled with the second electrode of the switch transistor 12 through the contact hole 21.

Figure 4:
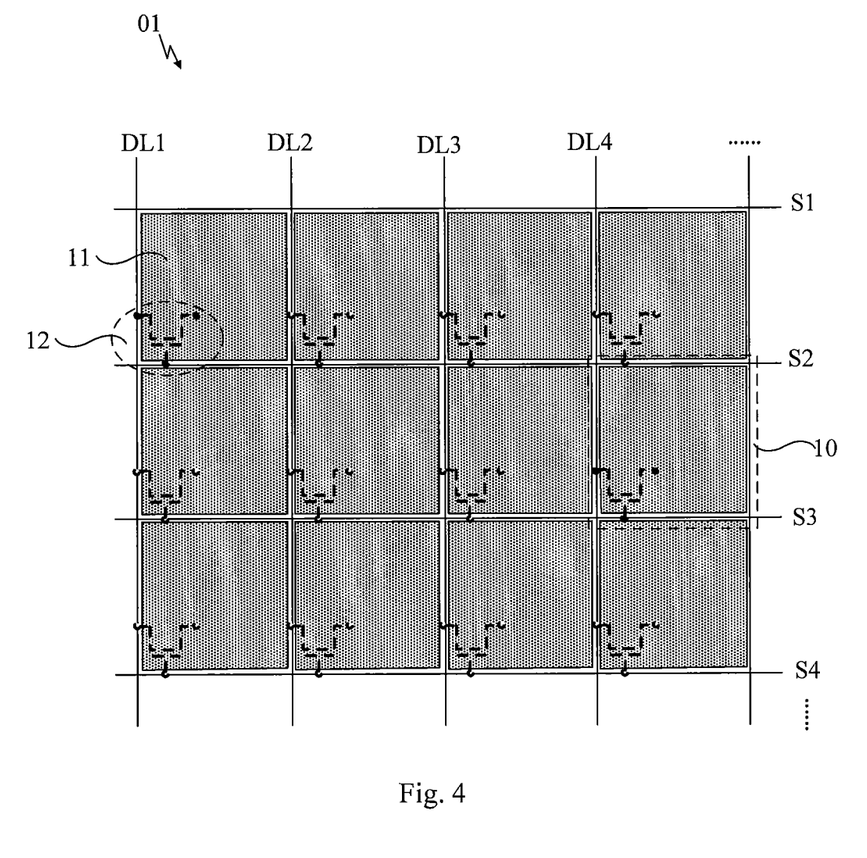
FIG. 4 is a structural schematic view of a fingerprint identification device provided by at least one embodiment of this disclosure.

On the basis of this, in order to increase the area of the photosensitive element 11 that receives light, as shown in FIG. 4, the area of the photosensitive element 11 is same as the opening area of the identification unit 10. Furthermore, the shape of the photosensitive element 11 is same as the opening shape of the identification unit 10. The opening of the identification unit 10 refers to an area enclosed by the scanning lines (e.g., S1 and S2) and the read signal lines (e.g., DL1 and DL2) for cross-defining the identification unit 10. In such a case, when a plurality of scanning lines are disposed in parallel, a plurality of read signal lines are disposed in parallel, and any scanning line is perpendicular to any read signal line, the opening shape of the identification unit 10 is a rectangle as shown in FIG. 4.

Figure 6:
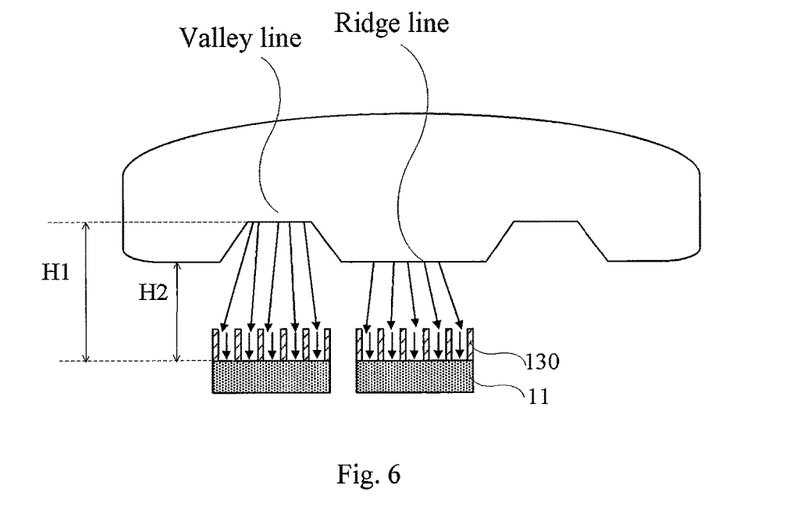
FIG. 6 is a schematic view of identifying the fingerprint using the fingerprint identification device as shown in FIG. 5.

The material of the strip-shaped light guide portion 130 can be a light shielding material. Or, the strip-shaped light guide portion 130 can be an optical fiber. In such a case, as shown in FIG. 6, after the light reflected by the finger enters a gap between two adjacent light guide portions 130, it will be incident to the photosensitive element 11 along the extending direction of the gap, so as to reduce the probability of crosstalk of the light of two adjacent gaps. FIG. 6 shows that the reflected light is incident to the photosensitive element 11 along the extending direction of the gap, i.e., the reflected light can be further reflected by the outer surface of the strip-shaped light guide portion 130, so as to reach the corresponding photosensitive element 11. In some embodiments, the strip-shaped light guide portion 130 is made of a material selected from a group of: a reflective metal material, glass and a resin material. When the strip-shaped light guide portion 130 is an optical fiber, the reflected light can be further reflected by the outer surface of the strip-shaped light guide portion 130, and can also be guided by the optical fiber (i.e., traveling through total internal reflection of the optical fiber), so as to reach the corresponding photosensitive element 11.

The specific process of performing fingerprint identification by the photosensitive element 11 will be introduced in detail below. The surface of the finger has ridge lines and valley lines, as shown in FIG. 6. The distance between the valley line and the photosensitive element 11 is H1, and the distance between the ridge line and the photosensitive element 11 is H2 (H1>H2). Hence, the intensity of the light reflected by the valley line to the collimating filter layer 13 is relatively smaller because the transmission distance is relatively longer, while the intensity of the light reflected by the ridge line to the collimating filter layer 13 is relatively larger because the transmission distance is relatively shorter. In such a case, through the guiding effect of the collimating filter layer 13, the intensity of the light received by the photosensitive element 11 at a position corresponding to the valley line is relatively smaller, so that the converted current transmitted through the switch transistor 12 coupled with the photosensitive element 11 to the read signal line (e.g., DL1) is relatively smaller. Meanwhile, the intensity of the light received by the photosensitive element 11 at a position corresponding to the ridge line is relatively larger, so that the converted current transmitted through the switch transistor 12 coupled with the photosensitive element 11 to the read signal line (e.g., DL2) is relatively larger. In this way, the valley line or the ridge line of the fingerprint can be detected by detecting the magnitudes of the currents output by different identification unit 10 through different read signal lines.

To sum up, in the process of fingerprint identification, after the light reflected by the finger is illuminated to the photosensitive element 11, the incident light can be illuminated to the photosensitive element 11 in parallel or perpendicularly through the collimating filter layer 13. The photosensitive element 11 can perform photoelectric conversion of the incident light. By receiving light of different intensities reflected by the valley lines and the ridge lines of the finger, different electric signals are output to the read signal lines of different identification units 10, so as to achieve the purpose of identifying the fingerprint of the finger. In the fingerprint identification process, the collimating filter layer 13 can play the guiding role to the light reflected by the finger, so as to enable the incident light to be illuminated to the photosensitive element 11 in parallel, thereby being capable of reducing the scattering degree of the light reflected by the finger. In this way, when the fingerprint identification device 01 is applied in a display apparatus, even if other components such as the cover glass 02 is disposed between the finger and the fingerprint identification device 01, which results in a relatively large distance between the finger and the fingerprint identification device 01, the accuracy of the light reflected by the finger incident to the photosensitive element 11 can still be improved by the collimating filter layer 13, so as to be capable of improving the precision of fingerprint identification by the photosensitive element 11.

On the basis of this, the display apparatus can be an organic light emitting diode (OLED) display apparatus. In order to improve the amount of light incident to the fingerprint identification device reflected by the finger, optionally, the OLED display apparatus is of a top-emission type.

Figure 7:
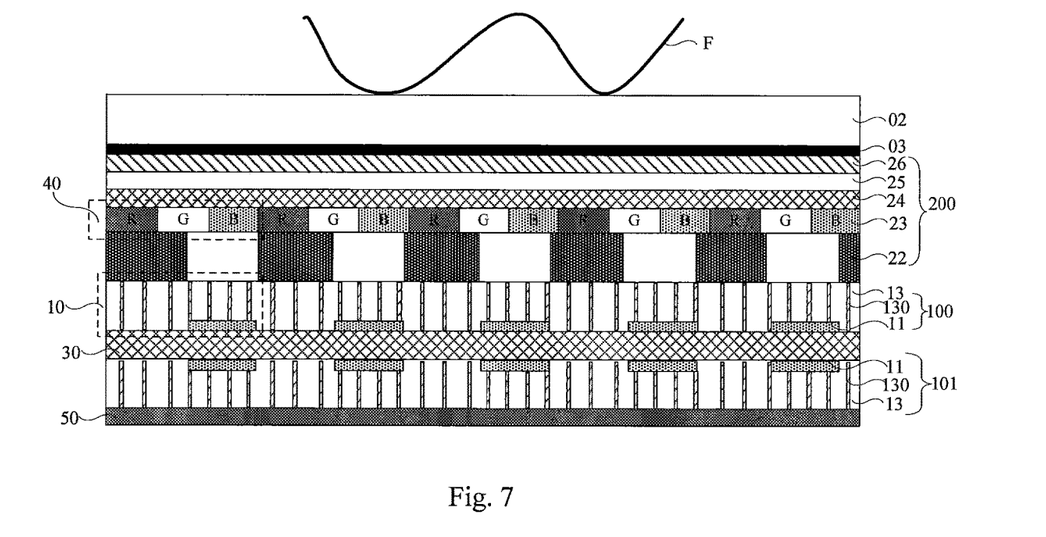
FIG. 7 is a structural schematic view of a display apparatus having two fingerprint identification devices provided by at least one embodiment of this disclosure.

Specifically, as shown in FIG. 7, the OLED display apparatus comprises a display panel 200. The display panel 200 comprises a base substrate 22, and an organic functional layer 23 (including a hole injection layer, a hole transport layer, a light emitting layer, an electron transport layer, an electron injection layer, a filter layer, etc.), a cathode 24, a polarizer 25 and an encapsulation film layer 26 (or a encapsulation cover plate) located above the base substrate 22 successively. Furthermore, the OLED display apparatus further comprises cover glass 02. The cover glass 02 which and is fitted with the display panel 200 are attached to each other through optical adhesive 03.

The at least one fingerprint identification device comprises a first fingerprint identification device 100. The first fingerprint identification device 100 is arranged on a non-light exit side of the display panel 200 and located in a display area of the display panel 200. And the photosensitive element 11 of the first fingerprint identification device 100 is arranged on a side of the first fingerprint identification device 100 away from the display panel 200 and is configured to receive the reflected display light.

Optionally, in order to ensure that the light reflected by the finger can be illuminated onto the photosensitive element 11 of the first fingerprint identification device 100, a position of the display panel 200 opposite to the photosensitive element 11 in the first fingerprint identification device 100 is light-transmissive.

Optionally, the wiring manner of the pixel circuit in the base substrate 22 can be set, so as to enable the data leads and electronic components such as transistors and capacitors to be no longer distributed at the position of the base substrate 22 corresponding to the photosensitive element 11. Or, a via hole 27 can be further disposed at a position of the base substrate 22 corresponding to the photosensitive element 11, so that the light reflected by the finger can be transmitted through the position where the electronic component or the via hole 27 is not disposed, and be illuminated to the photosensitive element 11.

In such a case, the collimating filter layer 13 in the first fingerprint identification device 100 is close to the display panel 200. Based on this, in the process of fingerprint identification, the OLED display apparatus emits display light to a side away from the first fingerprint identification device 100. As shown in FIG. 7, when the finger F touches the cover glass 02, the display light emitted by the OLED display apparatus is illuminated to the finger F, the finger F can reflect the display light, so as to enable the first fingerprint identification device 100 to receive the reflected light of the display light. Although the finger F and the first fingerprint identification device 100 cannot be in direct contact the first fingerprint identification device 100 is disposed on the no-light exit side of the display panel 200 so that the finger F and the first fingerprint identification device 100 cannot be in direct contact, since the reflected light of the display light can be incident to the photosensitive element 11 perpendicularly and in parallel after passing through the collimating filter layer 13, the scattering degree of the light reflected by the finger F can be reduced. In this way, most of the light reflected by the finger F can still enter the first fingerprint identification device 100, so as to ensure the efficiency and the precision of fingerprint identification, and improve the clarity of the collected fingerprint image.

Based on this, when the finger F of the user touches the cover glass 02, the fingerprint identification related operations such as fingerprint unlocking and fingerprint payment can be performed through the first fingerprint identification device 100.

It should be noted that the material of the photosensitive element can mainly comprise an organic photoelectric conversion material or an inorganic photoelectric conversion material. It's not defined by this disclosure. However, since the light reflected by the finger F is about half of the display light emitted by the OLED display apparatus, and after the light reflected by the finger F passing through the cover glass 02, the optical adhesive 03 and the display panel 200 successively, the light incident to the photosensitive light 11 is generally about 4% of light output of the OLED display apparatus. Hence, in order to improve fingerprint detection precision, optionally, the material of the photosensitive element 11 can be an organic photoelectric conversion material with a higher photoelectric conversion efficiency.

FIG. 7 shows a sectional view of a display apparatus according to at least one embodiment of this disclosure. As shown in FIG. 7, the display panel 200 comprises a plurality of pixel units 40, each pixel unit 40 comprising at least three sub-pixels, for example, red sub-pixel, blue sub-pixel and green sub-pixel. Each pixel unit 40 corresponds to an identification unit 10. In this way, after the resolution of the OLED display apparatus being improved, the pixels per inch (PPI) of the OLED display apparatus will also be increased accordingly, and the number of the pixel units 40 will be increased, so as to enable the number of the identification units 10 to be increased accordingly. Hence, the precision of fingerprint identification can be improved.

Alternatively, in order to reduce the manufacturing precision and cost, each identification unit 10 can correspond to an integer number of pixel units 40, e.g., three pixel units or four pixel units.

Figure 8:
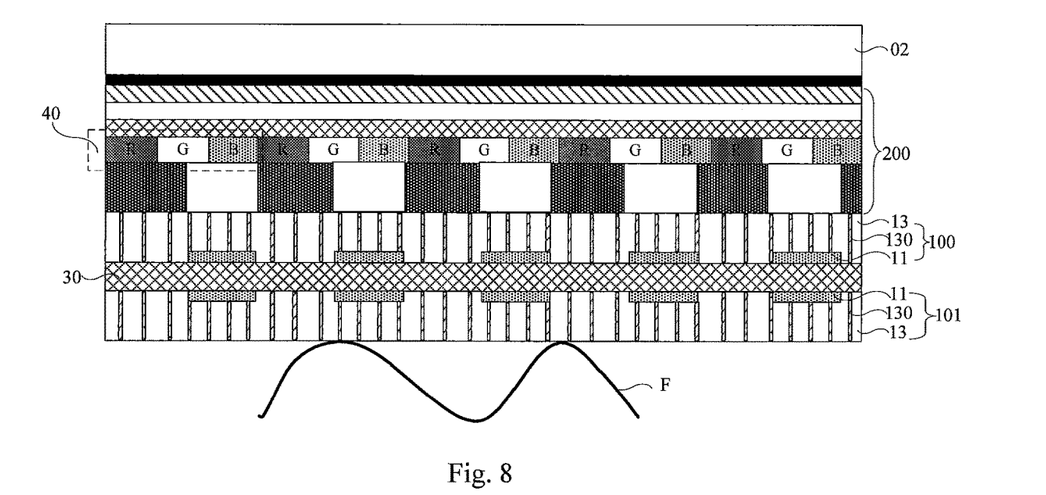
FIG. 8 is a structural schematic view of a display apparatus having two fingerprint identification devices provided by at least one embodiment of this disclosure.

In at least one embodiment, as shown in FIG. 7 or FIG. 8, the at least one fingerprint identification device comprises a second fingerprint identification device 101. The second fingerprint identification device 101 is arranged on a non-light exit side of the display panel 200, and the photosensitive element 11 of the second fingerprint identification device 101 is arranged on a side of the second fingerprint identification device 101 close to the display panel 200 and is configured to receive the reflected ambient light. In this embodiment, the collimating filter layer 13 in this second fingerprint identification device 101 is away from the display panel 200. Based on this, the second fingerprint identification device 101 stays in the ambient light and all the ambient light will enter the photosensitive elements 11 through the collimating filter layer 13. At this time, the photosensitive element 11 reads a whole piece of white light information.

In such a case, as shown in FIG. 8, when the finger F touches the second fingerprint identification device 101, the finger F destroys the total reflection of the ambient light in the second fingerprint identification device 101. At this time, the ambient light in the second fingerprint identification device 101 will be irradiated illuminated to the finger F and is reflected by the finger F so as to enter the individual photosensitive elements 11 through the collimating filter layer 13 again, thereby the detection of the fingerprint of the finger F can be realized by receiving light of different intensities reflected by the ridge lines and the valley lines of the finger F through different photosensitive elements 11.

Although the first fingerprint identification device 100 and the second fingerprint identification device 101 have been shown in both of the embodiments of FIG. 7 and FIG. 8, the ordinary skilled person in the art can understand that in the embodiments of this disclosure, the display apparatus can only have the first fingerprint identification device 100 or only have the second fingerprint identification device 101.

Based on this, since the fingerprint detection process is detection performed using the ambient light, while whether the display panel 200 emits display light is not limited, hence, when fingerprint detection is performed through the second fingerprint identification device 101, the display panel 200 may not perform image display, whereas the OLED display apparatus emits display light if the fingerprint detected by the second fingerprint identification device 101 is consistent with the fingerprint stored in the OLED display apparatus, so as to realize the screen wake-up function. Since the finger F of the user is located on the second fingerprint identification device 101 disposed on the non-light exit side of the display panel 200 when performing the screen wake-up function, the user can make the light exit side of the OLED display apparatus face towards himself, so as to be convenient for observing the image displayed by the screen after the screen is waken up.

Furthermore, after the screen of the OLED display apparatus is waken up, the user can perform fingerprint identification related operations such as fingerprint unlocking and fingerprint payment through the first fingerprint identification device 100 or through the second fingerprint identification device 101.

Further, from the above it can be seen that the finger F and the second fingerprint identification device 101 are in direct contact in the process of detecting the fingerprint through the second fingerprint identification device 101. Hence, in order to avoid the second fingerprint identification device 101 from being influenced by the external environment when not performing fingerprint identification, optionally, as shown in FIG. 7, the OLED display apparatus further comprises a push-pull baffle 50 disposed on a light entrance side of the second fingerprint identification device 101. The baffle 50 is used for exposing the second fingerprint identification device 101 in the push-open state and covering the light entrance side of the second fingerprint identification device 101 in the pull-up state.

Specifically, when the OLED display apparatus comprises a back cover (not shown in the figure) disposed on the non-light exit side of the OLED display apparatus, the baffle 50 can be mounted at a position of the back cover corresponding to the second fingerprint identification deice in an active link manner.

The position setting manners of the first fingerprint identification device 100 and the second fingerprint identification device 101 will be illustrated below by way of example.

For example, as shown in FIG. 7 or FIG. 8, the positions of the first fingerprint identification device 100 and the second fingerprint identification device 101 can correspond to each other.

In such a case, the display apparatus further comprises a carrier substrate 30 arranged on the non-light exit side of the display panel 200. The first fingerprint identification device 100 is arranged on a surface of the carrier substrate 30 facing the display panel 200. The second fingerprint identification device 101 is arranged on a surface of the carrier substrate 30 away from the display panel 200. The carrier substrate 30 can be a glass substrate or a transparent resin substrate.

Although FIG. 7 shows the display apparatus having the first fingerprint identification device 100 and the second fingerprint identification device 101, the ordinary skilled person in the art can understand that the at least one embodiment as shown in FIG. 7 can also have the first fingerprint identification device 100 only.

Based on this, on one hand, when the fingerprint is detected through the first fingerprint identification device 100, the distance between the finger F and the first fingerprint identification device 100 is relatively large. Hence, in order to improve the detection precision of the first fingerprint identification device 100, optionally, the strip-shaped light guide portion 130 is an optical fiber. In the collimating filter layer 13 of the first fingerprint identification device 100, the numerical aperture of the optical fiber is 0.001~0.2. In this way, under the effect of the optical fiber in the collimating filter layer of the first fingerprint identification device 100, the incident angle of the light incident to the photosensitive element 11 of the first fingerprint identification device 100 can be reduced, thereby being capable of further reducing the probability of crosstalk of light incident to two adjacent photosensitive elements 11, so as to improve precision of fingerprint identification.

On the other hand, the strip-shaped light guide portion 130 can be an optical fiber. When the fingerprint is detected through the second fingerprint identification device 101, the distance between the finger F and the second fingerprint identification device 101 is relatively small. Hence, in the collimating filter layer 13 of the second fingerprint identification device 101, the numerical aperture of the optical fiber can be a little bit larger, e.g., 0.8~1. In this way, the amount of light incident to the photosensitive element 11 can be increased. At this time, the photoelectric conversion rate of the photosensitive element 11 can be reduced appropriately so as to reduce the production cost.

Furthermore, the core diameter of the optical fiber in the collimating filter layer 13 of the first fingerprint identification device 100 or the second fingerprint identification device 101 can be 6 μm~80 μm, so as to meet requirements of different types of OLED display apparatus.

Figure 9:
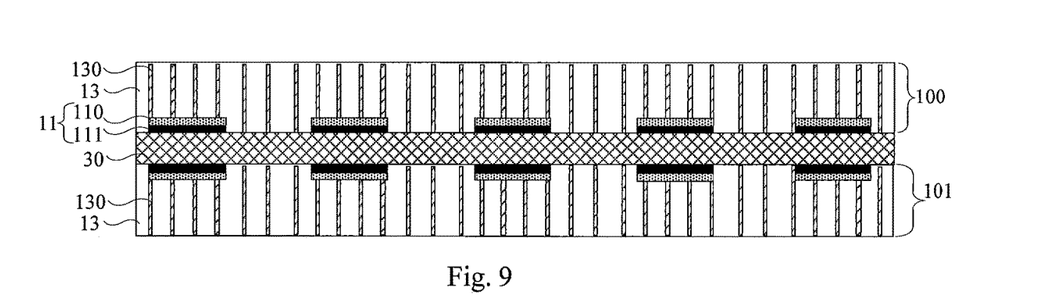
FIG. 9 is a structural schematic view of the photosensitive element in FIG. 8.

On the basis of this, because the positions of the first fingerprint identification device 100 and the second fingerprint identification device 101 correspond to each other, in order to avoid mutual interference of light incident to the two fingerprint identification devices respectively, optionally, as shown in FIG. 9, the photosensitive elements 11 of the first fingerprint identification device 100 and the second fingerprint identification device 101 comprise a photoelectric conversion layer 110 and a light shielding layer 111. The light shielding layer 111 is disposed close to the carrier substrate 30.

In this way, the light incident to the photoelectric conversion layer 110 of the first fingerprint identification device 100, under the effect of the light shielding layer 111, would not be illuminated to the photoelectric conversion layer 110 of the second fingerprint identification device 101 through the carrier substrate 30. Similarly, the light incident to the photoelectric conversion layer 110 of the second fingerprint identification device 101, under the effect of the light shielding layer 111, would not be illuminated to the photoelectric conversion layer 110 of the first fingerprint identification device 100 through the carrier substrate 30.

It should be noted that from the above it can be seen that the material of the photoelectric conversion layer 110 can be an organic photoelectric conversion material or an inorganic photoelectric conversion material.

Figure 10:
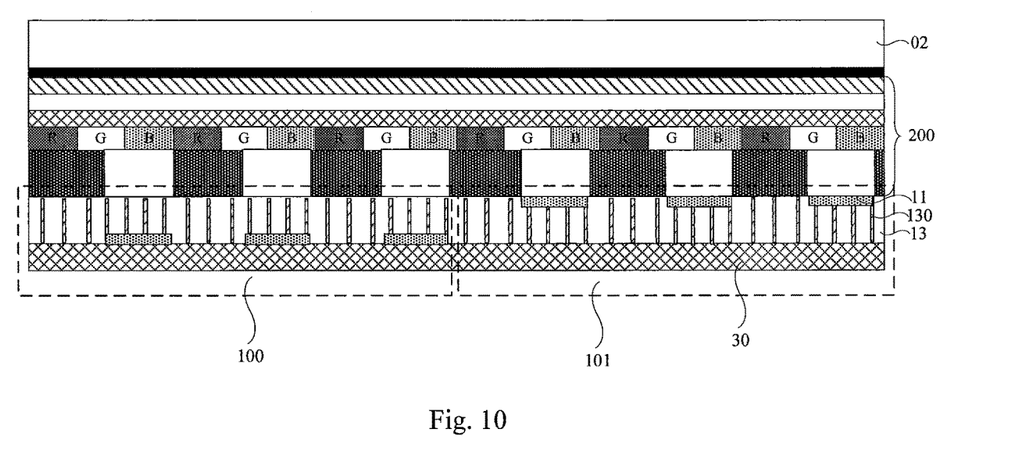
FIG. 10 is a structural schematic view of a display apparatus having two fingerprint identification devices provided by at least one embodiment of this disclosure.

As shown in FIG. 10, in some embodiments, the display apparatus further comprises a carrier substrate 30 arranged on the non-light exit side of the display panel 200. The first fingerprint identification device 100 and the second fingerprint identification device 101 are arranged on a surface of the carrier substrate 30 facing the display panel 200. The orthographic projection of the first fingerprint identification device 100 on the carrier substrate 30 and the orthographic projection of the second fingerprint identification device 101 on the carrier substrate 30 do not overlap with each other. In this way, the first fingerprint identification device 100 and the second fingerprint identification device 101 can be located in a same layer, so as to be benefit for reducing the thickness of the OLED display apparatus. Furthermore, for the arrangement manner shown in FIG. 10, the fingerprint detection processes of the first fingerprint identification device 100 and the second fingerprint identification device 101 are same as above, which will not be repeated herein.

In such a case, when the fingerprint is detected using the second fingerprint identification device 101, because the finger F is in contact with the carrier substrate, and could not be in direct contact with the second fingerprint identification device 101, the distance between the finger F and the second fingerprint identification device 101 is increased. Therefore, in order to improve the detection precision of the second fingerprint identification device 101, optionally, when the strip-shaped light guide portion 130 is an optical fiber, in the collimating filter layer 13 of the second fingerprint identification device 101, the numerical aperture of the optical fiber can be 0.001~0.2. In this way, under the effect of the optical fiber in the collimating filter layer 13 of the second fingerprint identification device 101, the incident angle of the light incident to the photosensitive element 11 of the second fingerprint identification device 101 can be reduced, thereby being capable of further reducing the probability of crosstalk of light incident to two adjacent photosensitive elements 11, so as to improve precision of fingerprint identification.

Figure 11:
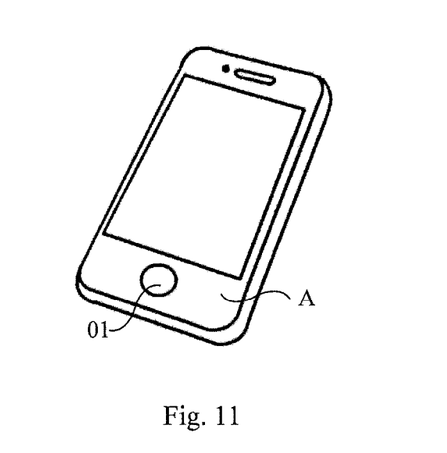
FIG. 11 is a schematic view of a display apparatus provided by at least one embodiment of this disclosure.
Figure 12:
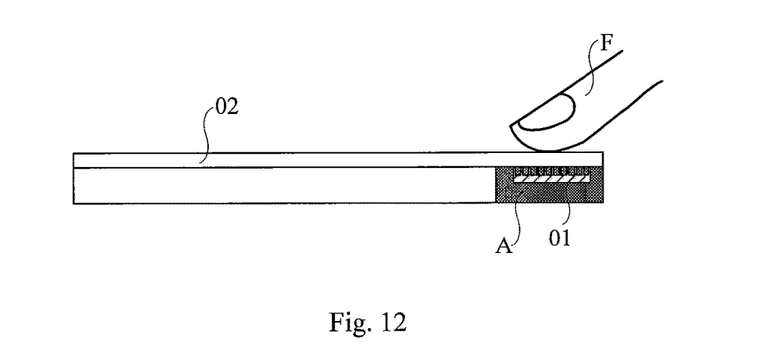
FIG. 12 is a sectional view of a display apparatus provided by at least one embodiment of this disclosure.

Further, as shown in FIG. 11 and FIG. 12, in the display apparatus provided by at least one embodiment of this disclosure, the at least one fingerprint identification device comprises a third fingerprint identification device 01. The third fingerprint identification device 01 is arranged on a light exit side of the display panel and located in a non-display area A of the display panel. The photosensitive element of the third fingerprint identification device 01 is arranged on a side of the third fingerprint identification device 01 close to the display panel and is configured to receive the reflected ambient light. The third fingerprint identification device 01, as shown in FIG. 11, can be disposed on the light exit side of the display apparatus and located in the non-display area A of the display apparatus, e.g., the position of the Home button. In such a case, since the collimating filter layer 13 of the fingerprint identification device 01 can make the incident light be incident onto the photosensitive element 11 perpendicularly and in parallel, the scattering degree of the light reflected by the finger can be reduced. In this way, even if the finger is not in direct contact with the fingerprint identification device 01, most of the light reflected by the finger can still enter the fingerprint identification device 01, so as to ensure the efficiency and the precision of the fingerprint identification, and improve the clarity of the collected fingerprint image. Furthermore, the Home button can be omitted directly so as to reduce the cost.

In such a case, because the finger does not have to be in direct contact with the fingerprint identification device 01, as shown in FIG. 12, the touch hole does not have to be disposed at a position of the cover glass 02 of the display apparatus corresponding to the fingerprint identification device 01. In this way, the manufacturing process of the cover glass 02 can be simplified, so as to improve the product yield, and ensure the flatness of the surface of the display apparatus.

It should be noted that the display panel is an OLED display panel or a liquid crystal display panel, i.e., the display apparatus can be an OLED display apparatus or a liquid crystal display (LCD).

When the display apparatus is a LCD, the fingerprint identification device 01 can also be disposed on the non-light exit side of the LCD. At this time, the arrangement manner of the fingerprint identification device 01 is same as that of the second fingerprint identification device 101 as shown in FIG. 8, which will not be repeated herein.

Furthermore, when the area of the fingerprint identification device 01 is relatively small, the fingerprint identification device 01 can be arranged on the light exit side of the display apparatus and located in the display area of the display apparatus, so as to reduce the distance between the fingerprint identification device 01 and the finger on the basis of avoiding great influence to the display effect, thereby improving the precision of fingerprint identification. At this time, the arrangement manner of the fingerprint identification device 01 is same as that of the first fingerprint identification device 100 as shown in FIG. 8, which will not be repeated herein.

At least one embodiment of this disclosure provides a display apparatus, comprising a display panel and at least one fingerprint identification device. Each fingerprint identification device comprises a plurality of identification units arranged in an array. Each identification unit is provided with a photosensitive element. The photosensitive element is used for performing photoelectric conversion of incident light. Furthermore, the fingerprint identification device further comprises a collimating filter layer arranged on a light entrance surface of the photosensitive element. The collimating filter layer comprises a plurality of strip-shaped light guide portions arranged to be spaced and parallel, a longitudinal direction of the plurality of strip-shaped light guide portions being substantially perpendicular to the light entrance surface of the photosensitive element. The collimating filter layer is used for enabling the incident light to be illuminated to the photosensitive element in parallel. In the process of fingerprint identification, after the light reflected by the finger being illuminated to the photosensitive element, the incident light can be illuminated to the photosensitive element in parallel or perpendicularly through the collimating filter layer. The photosensitive element can perform photoelectric conversion of the incident light, and output different electric signals to the read signal lines of different identification units by receiving light of different intensities reflected by the valley lines and the ridge lines of the finger, so as to achieve the purpose of identifying the fingerprint of the finger. In the process of fingerprint identification, the collimating filter layer can guide the light reflected by the finger so as to enable the incident light to be illuminated to the photosensitive element in parallel, thereby being capable of reducing the scattering degree of the light reflected by the finger. In this way, when the fingerprint identification device is applied in a display apparatus, even if other components such as the cover glass are disposed between the finger and the fingerprint identification device, which causes the distance between the finger and the fingerprint identification device to be increased, the probability of the light reflected by the finger being incident to the photosensitive element can still be improved through the collimating filter layer, so as to be capable of improving the precision of fingerprint identification of the photosensitive element.

What stated above are only embodiments of this disclosure. However, the protection scope of this disclosure is not limited to this. Any modifications or replacements that can be easily conceived by the ordinary skilled person familiar with the present technical field within the technical scope disclosed by this disclosure should be encompassed within the protection scope of this disclosure. Therefore, the protection scope of this disclosure should be subject to the protection scopes of the claims.

The invention claimed is:

1. A display apparatus, comprising:
   a display panel; and
   at least one fingerprint identification device,
   wherein the at least one fingerprint identification device comprises a plurality of identification units arranged in an array,
   wherein an identification unit of the plurality of identification units comprises a photosensitive element configured to perform photoelectric conversion of incident light,
   wherein the at least one fingerprint identification device further comprises a collimating filter layer on a light entrance surface of the photosensitive element,
   wherein the collimating filter layer comprises a plurality of strip-shaped light guide portions spaced apart from and parallel to one another,
   wherein a longitudinal direction of the plurality of strip-shaped light guide portions is substantially perpendicular to the light entrance surface of the photosensitive element,
   wherein the at least one fingerprint identification device comprises a first fingerprint identification device comprising the identification unit,
   wherein the first fingerprint identification device is on a non-light exit side of the display panel and is located in a display area of the display panel,
   wherein the photosensitive element of the identification unit is on a side of the first fingerprint identification device away from the display panel and is configured to receive reflected display light,
   wherein the identification unit comprises a first identification unit,
   wherein the photosensitive element comprises a first photosensitive element, wherein the at least one fingerprint identification device further comprises a second fingerprint identification device comprising a second identification unit, wherein the second fingerprint identification device is on the non-light exit side of the display panel, wherein a second photosensitive element of the second identification unit is on a side of the second fingerprint identification device adjacent to the display panel and is configured to receive reflected ambient light, wherein the display panel further comprises:

a carrier substrate on the non-light exit side of the display panel, wherein the first fingerprint identification device is on a first surface of the carrier substrate facing the display panel, and wherein the second fingerprint identification device is on a second surface of the carrier substrate away from the display panel.

2. The display apparatus according to claim 1, wherein at least one of the strip-shaped light guide portions comprises an optical fiber.

3. The display apparatus according to claim 1,
wherein the at least one fingerprint identification device comprises a third fingerprint identification device,
wherein the third fingerprint identification device is on a light exit side of the display panel and is in a non-display area of the display panel;
wherein a third photosensitive element of a third identification unit is on a side of the third fingerprint identification device adjacent to the display panel and is configured to receive reflected ambient light.

4. The display apparatus according to claim 1, wherein the display panel comprises an organic light emitting diode (OLED) display panel or a liquid crystal display (LCD) display panel.

5. The display apparatus according to claim 1,
wherein the plurality of strip-shaped light guide portions comprises an optical fiber,
wherein the collimating filter layer of the first fingerprint identification device comprises a numerical aperture of the optical fiber that is between 0.001 to 0.2, and
wherein a core diameter of the optical fiber is between 6 micrometers (μm) to 80 μm.

6. The display apparatus according to claim 1,
wherein the plurality of strip-shaped light guide portions comprises an optical fiber, and
wherein the collimating filter layer of the second fingerprint identification device comprises a numerical aperture of the optical fiber that is between 0.8 to 1, and
wherein a core diameter of the optical fiber is between 6 micrometers (μm) to 80 μm.

7. The display apparatus according to claim 1,
wherein the photosensitive element comprises a photoelectric conversion layer and a light shielding layer,
wherein the light shielding layer is closer to the carrier substrate than the photoelectric conversion layer.

8. The display apparatus according to claim 1, further comprising:
a push-pull baffle on a light entrance side of the second fingerprint identification device,
wherein the push-pull baffle exposes the second fingerprint identification device in a push-open state, and
wherein the push-pull baffle covers the light entrance side of the second fingerprint identification device in a pull-up state.

9. The display apparatus according to claim 1,
wherein the at least one fingerprint identification device further comprises a plurality of scanning lines and a plurality of read signal lines that are crisscrossed,
wherein crossings of the plurality of scanning lines and the plurality of read signal lines define the plurality of the identification units, and
wherein the identification unit of the plurality of identification units comprises a switch transistor, a first electrode of the switch transistor that is coupled to a read signal line of the plurality of the read signal lines, a gate of the switch transistor that is coupled to a scanning line of the plurality of the scanning lines, and a second electrode of the switch transistor that is coupled to the photosensitive element.

10. The display apparatus according to claim 1,
wherein the strip-shaped light guide portion comprises a reflective metal material, glass, or a resin material.

11. A display apparatus, comprising:
a display panel; and
at least one fingerprint identification device,
wherein the at least one fingerprint identification device comprises a plurality of identification units arranged in an array,
wherein an identification unit of the plurality of identification units comprises a photosensitive element configured to perform photoelectric conversion of incident light,
wherein the at least one fingerprint identification device further comprises a collimating filter layer on a light entrance surface of the photosensitive element,
wherein the collimating filter layer comprises a plurality of strip-shaped light guide portions spaced apart from and parallel to one another,
wherein a longitudinal direction of the plurality of strip-shaped light guide portions is substantially perpendicular to the light entrance surface of the photosensitive element,
wherein the at least one fingerprint identification device comprises a first fingerprint identification device comprising the identification unit,
wherein the first fingerprint identification device is on a non-light exit side of the display panel and is located in a display area of the display panel,
wherein the photosensitive element of the identification unit is on a side of the first fingerprint identification device away from the display panel and is configured to receive reflected display light,
wherein the identification unit comprises a first identification unit,
wherein the photosensitive element comprises a first photosensitive element,
wherein the at least one fingerprint identification device further comprises a second fingerprint identification device comprising a second identification unit,
wherein the second fingerprint identification device is on the non-light exit side of the display panel,
wherein a second photosensitive element of the second identification unit is on a side of the second fingerprint identification device adjacent to the display panel and is configured to receive reflected ambient light,
wherein the display apparatus further comprises:
a carrier substrate arranged on the non-light exit side of the display panel,
wherein the first fingerprint identification device and the second fingerprint identification device are on a surface of the carrier substrate facing the display panel, and wherein a first orthographic projection of the first fingerprint identification device on the carrier substrate and a second orthographic projection of the second fingerprint identification device on the carrier substrate do not overlap with each other.

12. The display apparatus according to claim 11, wherein at least one of the strip-shaped light guide portions comprises an optical fiber.

13. The display apparatus according to claim 11,
wherein the at least one fingerprint identification device comprises a third fingerprint identification device,
wherein the third fingerprint identification device is on a light exit side of the display panel and is in a non-display area of the display panel;
wherein a third photosensitive element of a third identification unit is on a side of the third fingerprint identification device adjacent to the display panel and is configured to receive reflected ambient light.

14. The display apparatus according to claim 11, wherein the display panel comprises an organic light emitting diode (OLED) display panel or a liquid crystal display (LCD) display panel.

15. The display apparatus according to claim 11,
wherein the plurality of strip-shaped light guide portions comprises an optical fiber,
wherein the collimating filter layer of the first fingerprint identification device comprises a numerical aperture of the optical fiber that is between 0.001 to 0.2, and
wherein a core diameter of the optical fiber is between 6 micrometers (μm) to 80 μm.

16. The display apparatus according to claim 11,
wherein the plurality of strip-shaped light guide portions comprises an optical fiber, and
wherein the collimating filter layer of the second fingerprint identification device comprises a numerical aperture of the optical fiber that is between 0.8 to 1, and wherein a core diameter of the optical fiber is between 6 micrometers (μm) to 80 μm.

17. The display apparatus according to claim 11,
wherein the photosensitive element comprises a photoelectric conversion layer and a light shielding layer,
wherein the light shielding layer is closer to the carrier substrate than the photoelectric conversion layer.

18. The display apparatus according to claim 11, further comprising:
a push-pull baffle on a light entrance side of the second fingerprint identification device,
wherein the push-pull baffle exposes the second fingerprint identification device in a push-open state, and
wherein the push-pull baffle covers the light entrance side of the second fingerprint identification device in a pull-up state.

19. The display apparatus according to claim 11,
wherein the at least one fingerprint identification device further comprises a plurality of scanning lines and a plurality of read signal lines that are crisscrossed,
wherein crossings of the plurality of scanning lines and the plurality of read signal lines define the plurality of the identification units, and
wherein the identification unit of the plurality of identification units comprises a switch transistor, a first electrode of the switch transistor that is coupled to a read signal line of the plurality of the read signal lines, a gate of the switch transistor that is coupled to a scanning line of the plurality of the scanning lines, and a second electrode of the switch transistor that is coupled to the photosensitive element.

20. The display apparatus according to claim 11,
wherein the strip-shaped light guide portion comprises a reflective metal material, glass, or a resin material.

* * * * *